March 13, 1962 R. S. CODRINGTON 3,025,456
MAGNETIC RESONANCE METHODS AND APPARATUS
Filed Nov. 10, 1955 2 Sheets-Sheet 2

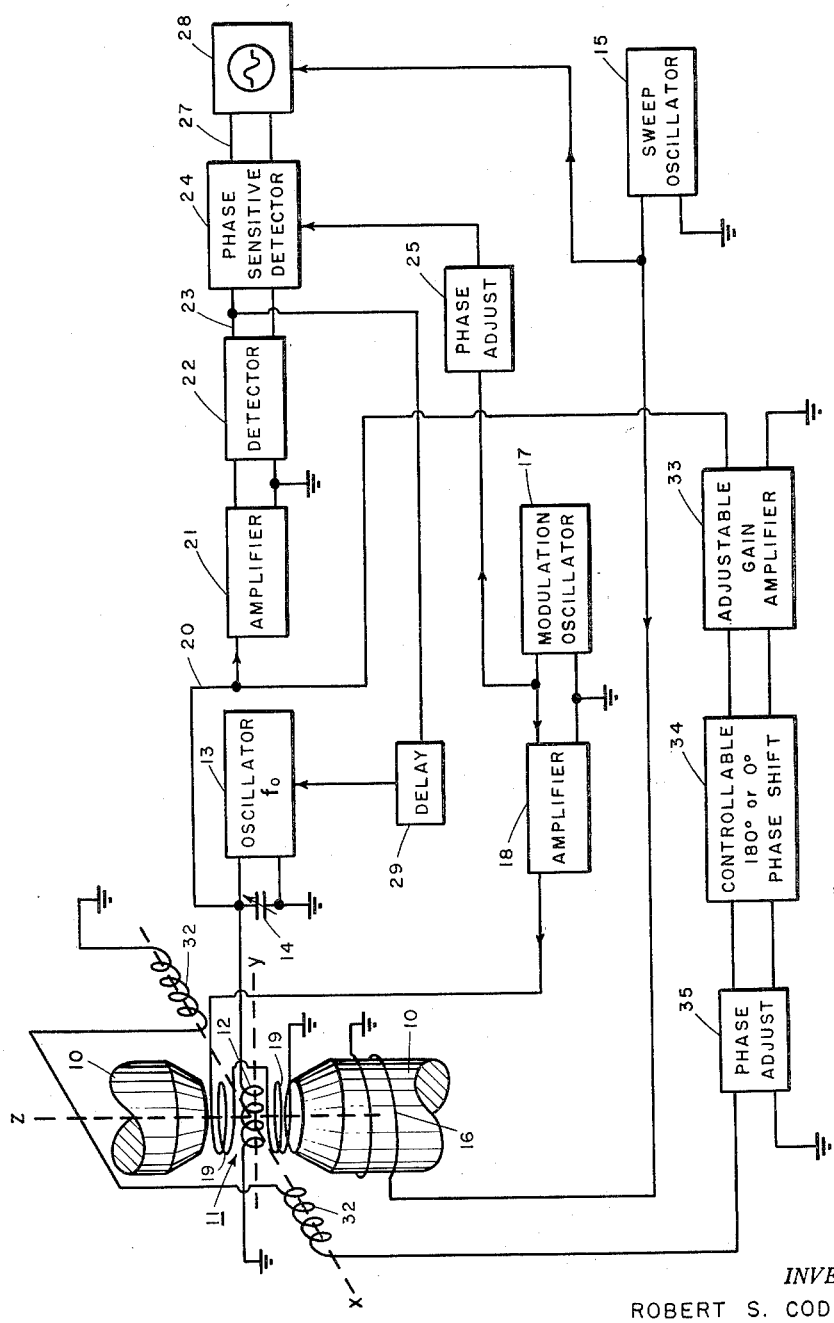

INVENTOR.
ROBERT S. CODRINGTON
BY
HIS ATTORNEY

United States Patent Office 3,025,456
Patented Mar. 13, 1962

3,025,456
MAGNETIC RESONANCE METHODS AND APPARATUS
Robert S. Codrington, Ridgefield, Conn., assignor, by mesne assignments, to Schlumberger Well Surveying Corporation, Houston, Tex., a corporation of Texas
Filed Nov. 10, 1955, Ser. No. 546,193
5 Claims. (Cl. 324—.5)

The present invention relates to magnetic resonance methods and apparatus, and more particularly to new and improved methods and apparatus for obtaining indications of nuclear and other paramagnetic resonance phenomena.

Electron and nuclear paramagnetic resonances have been observed in the past by utilizing magnetic resonance spectrometers which detect the absorption of energy from an alternating magnetic field by a paramagnetic sample under investigation. In general, the sample is placed in a unidirectional magnetic field and a coil is disposed in the vicinity of the sample, such that an alternating magnetic field is generated within the sample perpendicularly to the unidirectional field when the coil is activated with alternating current. The coil is electrically connected as a portion of the tank circuit of a high frequency oscillator which is adapted to generate current at the resonance precession frequency of particular paramagnetic particles in the sample. The resonance is observed as a result of the loading of the tank circuit caused by the absorption of energy at the resonance precession frequency from the coil.

However, in the past such systems have suffered from a serious drawback resulting from certain contradictory requirements. For maximum sensitivity the alternating magnetic field throughout the sample under investigation should be maintained at one level, while for maximum oscillator stability the oscillator should generate current through the coil of such magnitude as to create an alternating magnetic field throughout the sample at a level substantially different from the one desired for maximum sensitivity.

For example, in many applications, the alternating magnetic field intensity must be maintained at a relatively low level in order to avoid saturation of the sample and thus maintain the sensitivity of the system. On the other hand, for stability the oscillator must generate relatively high intensity current through the coil, thus creating a relatively high intensity alternating field throughout the sample. In other applications, the alternating magnetic field must be maintained at a relatively high intensity for best sensitivity, while for oscillator stability the field intensity should be appreciably lower. In the past, such contradictory requirements have resulted generally in the systems being operated in a region of reduced sensitivity and of minimum oscillator stability.

Accordingly, it is a primary object of the present invention to provide new and improved magnetic resonance methods and apparatus of the aforementioned type in which the alternating current generated by the oscillator through the tank circuit coil may be of any required level, and yet the effective alternating magnetic field is at any different level that may be desired.

Another object of the present invention is to provide new and improved magnetic resonance apparatus of the aforementioned type in which the system may be operated in a region of maximum sensitivity while at the same time the oscillator is in a region of maximum stability.

Another object of the present invention is to provide new and improved methods and apparatus of the aforementioned type in which the effective alternating magnetic field is both stable and of low enough intensity to avoid saturation of the sample under investigation.

These and other objects of the invention are attained by applying the primary alternating magnetic field at an intensity such that the oscillator may be operated in a region of maximum stability. In one embodiment, a second alternating magnetic field is simultaneously applied to the sample having such phase and amplitude as to combine with a portion of the primary alternating magnetic field to produce a resultant field which is rotating in a direction opposite to the direction of precession of the magnetic moments associated with the resonance. This counter-rotating field will have substantially no effect on the precession. As a result, insofar as the resonance is concerned the effective applied field is reduced by the amount of that portion of the primary field which is combined with the second field. This reduced field may be readily made small enough to avoid saturation and thus maintain maximum sensitivity. On the other hand, the output of the oscillator to the tank coil may be maintained at a level sufficiently high to assure stability. Alternatively, in another embodiment the second alternating field may be of such phase that the resultant field is rotating in the direction of the precession, thereby operating the system at a relatively high level.

The invention will be more fully understood with reference to the accompanying drawings in which:

FIG. 1 represents paramagnetic resonance detecting apparatus incorporating a representative embodiment of the present invention;

Figure 3:
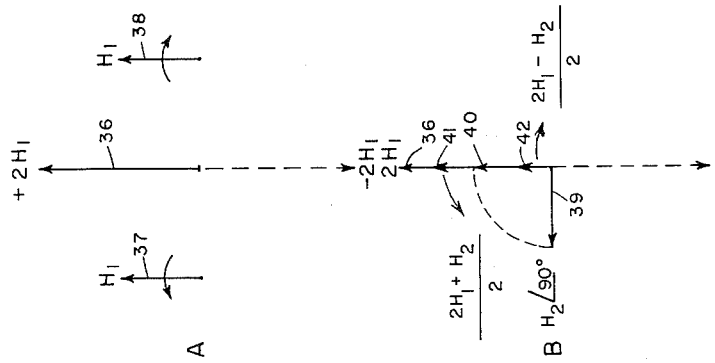
FIG. 3 is a series of vector diagrams utilized to explain some of the principles of the present invention.

In FIG. 1, a permanent or electromagnet 10 develops a constant, substantially homogeneous magnetic field in the region 11 between the pole faces thereof. A coil 12 is mounted in region 11 along the axis $y$ perpendicularly to the axis $z$, which is in the direction of the constant magnetic field. Coil 12 is arranged to receive interior thereof a paramagnetic sample placed in a suitable non-magnetic container such as a glass test tube (not shown). Coil 12 forms one element of the tank circuit of oscillator 13, variable capacitor 14 comprising the remainder of the oscillator tank circuit.

The constant magnetic field generated by magnet 10 is varied slowly between predetermined limits by the current generated by sweep oscillator 15 and passed through a coil 16 wound on magnet 10. In addition, the constant magnetic field is varied more rapidly between lower predetermined limits by the current generated by modulation oscillator 17, amplified by amplifier 18 and passed through coil 19 placed in region 11 parallel to the $z$ axis.

The variations in voltage across sample coil 12 are applied by conductor 20 to amplifier 21 and thence to detector 22, giving an output at conductor 23 proportional to the variations across coil 11. Output 23 is applied to balanced phase sensitive detector 24 receiving a sensitizing or reference signal from oscillator 17 via phase adjuster 25. The output 27 of detector 24 is applied to the vertical sweep of an oscilloscope 28 which receives its horizontal sweep from oscillator 15. In order that the output of oscillator 13 may be maintained substantially constant, the output of oscillator 13 across coil 12 may be amplitude controlled by a signal received from the output 23 of detector 22 through a delay device 29 providing a time delay greater than the period of the oscillations from oscillator 17.

In a typical example, assume that magnet 10 produces a constant field of 5000 gauss throughout the sample contained in coil 12, and that it is desired to detect proton resonance in the sample. The frequency of oscillator 13 is determined by the relation $$f_0 = \gamma H_0 / 2\pi \qquad (1)$$

where $\gamma$ is the gyromagnetic ratio of the particular paramagnetic particles under investigation; $H_0$ is the intensity of the constant field, and $f_0$ is the resonance precession frequency. For porton resonace $\gamma = 2.67 \times 10^4$, and thus in the example given above, from relation 1, the frequency of oscillator 13 is 21.2 megacycles.

Sweep oscillator 15 may provide a sawtooth wave at a frequency of 1/10 cycle/sec. which sweeps the constant field from a minimum of 4999 gauss to a maximum of 5001 gauss. Modulation oscillator 17 may provide a sine wave at a frequency of 30 cycles/sec. which varies the constant field by 20 milligauss, e.g., by approximately one-half the line width of the resonance under consideration.

Figure 2:
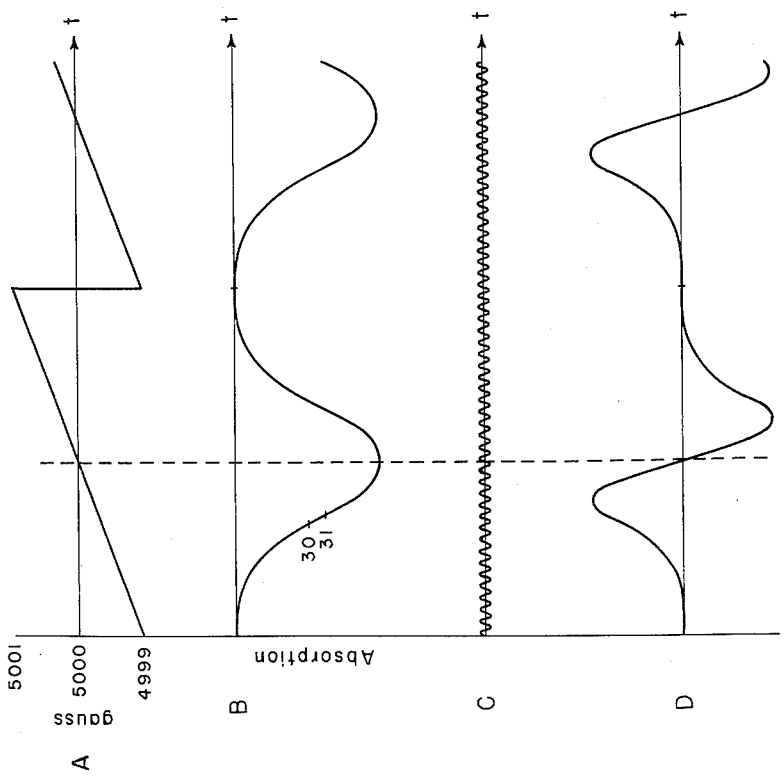
FIG. 2 is a series of current diagrams utilized to explain the operation of the apparatus shown in FIG. 1.

In operation of the circuit thus far described, oscillator 13 is activated, providing current through coil 12, which produces an alternating magnetic field through the sample under investigation, perpendicularly to the constant field. For reasons to be explained hereinafter the intensity of this alternating field is considered as being $2H_1$. As shown in FIG. 2A, the current through coil 16 varies the constant magnetic field slowly between 4999 and 5001 gauss. FIG. 2B represents the absorption of energy from coil 12 by the proton sample, as the intensity of the unidirectional magnetic field is varied. It can be seen that when the field is well below 5000 gauss (e.g., at 4999 gauss), the absorption is negligible, since the constant frequency of oscillator 13 at this point is well above the resonance precession frequency, as can be seen from relation 1. However, as the unidirectional field approaches 5000 gauss, the resonance precession frequency as determined from relation 1 approaches the frequency of the oscillator 13, and thus the absorption increases. At 5000 gauss, the resonance frequency and the oscillator frequency are, by design, exactly equal, and accordingly the absorption is at a maximum. As the constant field is further increased to 5001 gauss, the resonance frequency becomes higher than the oscillator frequency and the absorption decreases correspondingly.

In practice, it is usually more convenient to detect the derivative of the absorption curve shown in FIG. 2B, and to this end, the constant magnetic field is additionally modulated by the current through coil 19, as shown in FIG. 2C. This modulation varies the absorption between small limits, for example, between points 30 and 31 at one instant of time during the absorption curve, FIG. 2B. It is this variation that is detected in the output of phase sensitive detector 24, and thus the curve recorded on oscilloscope 28 is the derivative of the absorption, as shown in FIG. 2D. For a more extended treatment of magnetic resonance absorption phenomena, reference may be had to the literature, as for example to an article by Bloembergen, Purcell and Pound entitled "Relaxation Effects in Nuclear Magnetic Resonance Absorption," Physical Review, Volume 73, pages 679–712 (1948), and to an article entitled "Fundamentals of Nuclear Magnetic Resonance Absorption" Nos. I and II, by G. E. Pake, American Journal of Physics, Vol. 18, pages 438–452 and pages 473–486 (1950).

As mentioned above, however, the sensitivity of the aforementioned system depends on the intensity $2H_1$ of the alternating magnetic field applied by coil 12, and thus this intensity should be at such a level to assure maximum sensitivity. On the other hand, this intensity must be such that the oscillator 13 including tank circuit coil 12 and capacitor 14 is operating in a region of good stability. In accordance with the present invention, these heretofore contradictory requirements may be met by the application of a second alternating magnetic field to the sample along the axis $x$, perpendicularly to both the $z$ and the $y$ axes. To this end a coil 32 is arranged in region 11 parallel to the $x$ axis, and is activated with current at the same frequency as and of predetermined phase and intensity with respect to the current from oscillator 13. For this purpose the output 20 of oscillator 13 is connected to an adjustable gain amplifier 33, then to a phase shifter 34, providing either 180° or 0° phase shift at the will of an operator, and through a phase adjuster 35 to coil 32.

In order to understand the principles of the present invention reference may be had to FIG. 3. In FIG. 3A, the linear alternating magnetic field 36 applied by coil 12 is shown varying between limits $+2H_1$ and $-2H_1$ where the signs merely designate the instantaneous directions of the linear field. Such a linear field of intensity $2H_1$ may be considered as the sum of two rotating fields 37 and 38, respectively rotating in opposite directions. As is well-known, insofar as the resonance is concerned, we need consider only the component 37 or 38 which rotates in the direction of the resonance precession, the other component 38 or 37 which is rotating opposite to the direction of the resonance precession producing rapidly oscillating torques which average to zero. Thus the effective alternating field is one-half the intensity of the applied field, or $H_1$. In this instance let us assume that component 38 rotating clockwise is effective, while component 37 rotating counterclockwise is ineffective insofar as the resonance is concerned.

In accordance with one embodiment of the present invention where the field intensity must be low enough to avoid saturation, but should be at a higher level to assure oscillator stability, a second alternating field 39 of intensity $H_2$ less than $2H_1$ is applied 90° out of phase with field 36 as shown in FIG. 3B. This second field 39 will combine with that portion 40 of field 36 that is equal in intensity to $H_2$ to form an actual rotating field 41 of $$\frac{2H_1 + H_2}{2}$$

The phase of field 39 is such that the resultant field 41 is rotating in the direction counter to the resonance precession, i.e., in this example counterclockwise in the same direction as the direction of previous component 37 (FIG. 3A). This means that that portion 40 of field 36 that is equal to $H_2$ produces no effect on the resonance. Accordingly, only that portion 42 of field 36 that is the difference between $2H_1$ and $H_2$ is in effect applied to the precession and, as explained in connection with FIG. 3A, only one-half of this, or $$\frac{2H_1 - H_2}{2}$$

is in the direction of precession and thus effective.

For example, if field 36 is equal to $2H_1$ and field 39 is made equal to $H_1$ by adjusting the gain of amplifier 33 (FIG. 1), then the effective field in the direction of precession is only $\tfrac{1}{2} H_1$. In other words, the effective field intensity will be one-half the difference between the intensity of the primary alternating field $2H_1$ and the intensity of the second alternating field $H_2$. Accordingly, the field $2H_1$ may be made sufficiently large to insure stability in oscillator 13, and yet the effective field may be made sufficiently low to avoid saturation.

In operation, oscillator 13 is first adjusted to maximum stability. Coil 32 is then activated and the phase adjuster 35 utilized to assure that field 39 is 90° out of phase with field 36. If it is found that the resultant field 41 is rotating in the direction of the precession thus increasing saturation, the phase of field 39 may be reversed (180°) by phase shifter 34, thereby assuring rotation of resultant field 41 counter to the precession. The gain of amplifier 33 is then varied until the maximum sensitivity is reached. At this time oscilloscope 28 will record substantially the derivative of the absorption curve. This system finds great utility as a spectrometer, for example.

It should be noted that if the intensity $H_2$ of the auxiliary field 39 is increased to equal $2H_1$, the only effective field is one rotating counter to the direction of precession, and thus the two applied fields have no effect. If now the intensity $H_2$ is increased to a value greater than $2H_1$, the auxiliary field 39 becomes the primary field, but with a phase shift of 180° (90° in electrical phase plus 90° in spatial displacement) with respect to the phase of the primary field when $2H_1$ was greater than $H_2$. Thus the method may be conveniently employed to periodically provide a phase shift of 180° in the effective field by pulsing the intensity $H_2$ between a value less than $2H_1$ (including zero) to a value greater than $2H_1$.

In the foregoing representative embodiment, the auxiliary field 39 combines to form a resultant field rotating counter to the precession. In some cases, however, it may be desirable that intensity $H_2$ of the auxiliary field be either larger or smaller than $2H_1$ and of such phase as to combine to form a resultant field rotating in the direction of the precession, as for example under conditions when oscillator 13 and the corresponding detecting circuits 21, 22, 24 and 28 are unable to handle sufficient current to assure that field 36 is of large enough intensity to provide maximum sensitivity. Thus in the second embodiment phase shifter 34 is adjusted to reverse the phase of field 39 from the phase described in connection with the first embodiment. The gain of amplifier 33 is adjusted until maximum sensitivity is reached. For example, if the intensity of field 39 is made equal to $2H_1$, the resultant will be a field of intensity $2H_1$ rotating in the direction of the precession, and thus the effective field has been doubled.

Further, in the embodiments described above the coil 32 is perpendicular to coil 12. It will be understood that other acute angles may be employed which will still produce the desired resultant rotating field, though only that component of the field $H_2$ that is 90° out of phase with the field $2H_1$ will contribute to the effect.

As is well-known, in lieu of modulating the constant field by coils 16 and 19, the constant field may remain unmodulated, while the oscillator 13 is correspondingly modulated in frequency. Under these conditions amplifier 33, and phase shifters 34 and 35 must provide substantially constant phase shifts throughout the frequency range in interest.

Accordingly, it will be understood that the foregoing embodiment is merely representative and that the invention is limited only to the appended claims.

I claim:

1. In a method for detecting magnetic resonance phenomena wherein a unidirectional magnetic field is applied to a sample under investigation, the steps of applying a first alternating magnetic field to said sample at its Larmor frequency substantially perpendicularly to said unidirectional field, thereby establishing a direction of precession in said sample, applying a second alternating magnetic field to said sample at such frequency substantially perpendicularly to both said unidirectional field and said first alternating field and of such phase as to combine with said first alternating field to form a resultant magnetic field rotating counter to said direction, and varying the intensity of said second alternating field between intensities less than and greater than the intensity of said first alternating field to periodically provide a phase shift of 180° in said resultant field.

2. In a method for detecting magnetic resonance phenomena wherein a unidirectional and a first alternating magnetic field are applied respectively substantially perpendicularly to a sample under investigation, said first alternating magnetic field being applied at a magnetic resonance frequency of said sample, the steps of applying a second pulsed alternating magnetic field having the same frequency as the first alternating field to said sample substantially perpendicularly to both said unidirectional field and said first alternating field and out of phase with said first alternating field, and reversing the phase of said second alternating magnetic field.

3. In a method for detecting magnetic resonance phenomena wherein a unidirectional and a first alternating magnetic field are applied respectively substantially perpendicularly to a sample under investigation, said first alternating magnetic field being applied at the magnetic resonance frequency of said sample, the steps of applying a second alternating magnetic field at the same frequency as the first alternating field to said sample substantially perpendicularly to both said unidirectional field and said first alternating field and 90° out of phase with said first alternating magnetic field, while periodically varying the intensity of said second alternating magnetic field above and below the intensity of said first alternating magnetic field.

4. A method for detecting magnetic resonance phenomena wherein a unidirectional magnetic field is applied to a sample under investigation, comprising the steps of applying a first alternating magnetic field to said sample at its Larmor frequency substantially perpendicularly to said unidirectional field thereby establishing precession in said sample in a given direction, and applying a second alternating magnetic field to said sample at such frequency substantially perpendicularly to both said unidirectional field and said first alternating field with an intensity pulsed to a valve greater than said first alternating field and in a quadrature phase relation therewith to establish a resultant magnetic field rotating in said given direction of precession but periodically shifted in phase 180° with respect to the component of said first alternating magnetic field which is effectively rotating in such direction.

5. Apparatus for detecting magnetic resonance phenomena in a sample, comprising a magnet having pole pieces and providing a unidirectional magnetic field in the region therebetween, first coil means mounted in said region substantially perpendicularly to said unidirectional field and adapted to receive a sample interior thereof, an oscillator including a capacitor and means connecting said first coil means with said capacitor in a tank circuit for passing current through said first coil means to generate a first alternating field at the magnetic resonance frequency of said sample, second coil means mounted in said region substantially perpendicularly to said unidirectional field and to said first coil means, a phase shifting circuit connected between the output of said oscillator and said second coil means and including amplitude adjusting means and phase reversing means for supplying current to said second coil means with a phase and amplitude to establish a second alternating magnetic field having a magnitude substantially different from the magnitude of said first alternating field and phase-shifted 90° with respect thereto in a sense producing a resultant magnetic field rotating in the direction of precession in said sample which is of substantially lower intensity than the resultant magnetic field rotating counter to said direction, whereby said oscillator may be operated at a relatively high stable level without saturation of said sample, means for modulating said unidirectional field, and means connected with the output of said oscillator for detecting modulation of the voltage across said first coil means.

References Cited in the file of this patent

UNITED STATES PATENTS

| | | |
|---|---|---|
| 1,841,654 | Von Korschenewsky | Jan. 19, 1932 |
| 2,561,489 | Bloch et al. | July 24, 1951 |

OTHER REFERENCES

Thompson: Polyphase Elecrtic Currents, published by Spon (London), 1895 (pp. 60–62 relied on).

Rollin: "Nuclear Magnetic Resonance" Nature, vol. 158, pp. 669–670, November 9, 1946.

Thompson: Polyphase Electric Motors (2 ed.), published 1900 by Spon and Chamberlain (pp. 67–71 relied on).

Staub et al.: Helvetica Physica Acta, vol. 23, 1950, pp. 63–92.

Manus et al.: Academie des Sciences, Comptes Rendus, vol. 239, No. 5, August 1954, pp. 414 and 415.

Gilbert: Electricity and Magnetism, copyright 1941, New York, The MacMillan Co., revised edition, 1948, pp. 381 and 382.

Pound: Physical Review, August 15, 1950, vol. 79, No. 4, article in pp. 685–702. Pages 700 and 701 principally relied on.